United States Patent
Breen et al.

[15] 3,651,644
[45] Mar. 28, 1972

[54] APPARATUS FOR INITIATING DECOMPOSITION OF AN EXOTHERMIC PROPELLANT

[72] Inventors: Bernard P. Breen, South Pasadena; Bill R. Lawver, Glendora; James R. Kliegel, Redondo Beach, all of Calif.

[73] Assignee: Marshall Industries, San Marino, Calif.

[22] Filed: June 25, 1969

[21] Appl. No.: 836,504

Related U.S. Application Data

[62] Division of Ser. No. 670,242, Sept. 25, 1967.

[52] U.S. Cl. ............................60/203, 23/282, 60/39.14, 60/39.46, 60/39.82, 60/257, 204/164, 204/312
[51] Int. Cl. ...................F02k 9/02, B01k 3/00, B01j 7/00
[58] Field of Search ..................60/203, 257, 39.46, 39.14, 60/39.82 S; 204/164, 175, 177, 312; 23/282; 123/119 E

[56] References Cited

UNITED STATES PATENTS

| | | | |
|---|---|---|---|
| 2,849,357 | 8/1958 | Devins | 204/312 |
| 3,149,460 | 9/1964 | Rocca | 60/39.46 |
| 3,308,623 | 3/1966 | Ferrie | 60/203 |
| 3,427,808 | 2/1969 | Butcher | 60/203 |

*Primary Examiner*—Douglas Hart
*Attorney*—Fulwider, Patton, Rieber, Lee & Utecht

[57] ABSTRACT

An apparatus for initiating decomposition of exothermic propellants by developing an electric potential across spaced electrodes located in the propellant inlet stream, the electric potential being at a level high enough to effect decomposition and accompanying heat evolvement to facilitate starting of a rocket engine or the like.

4 Claims, 3 Drawing Figures

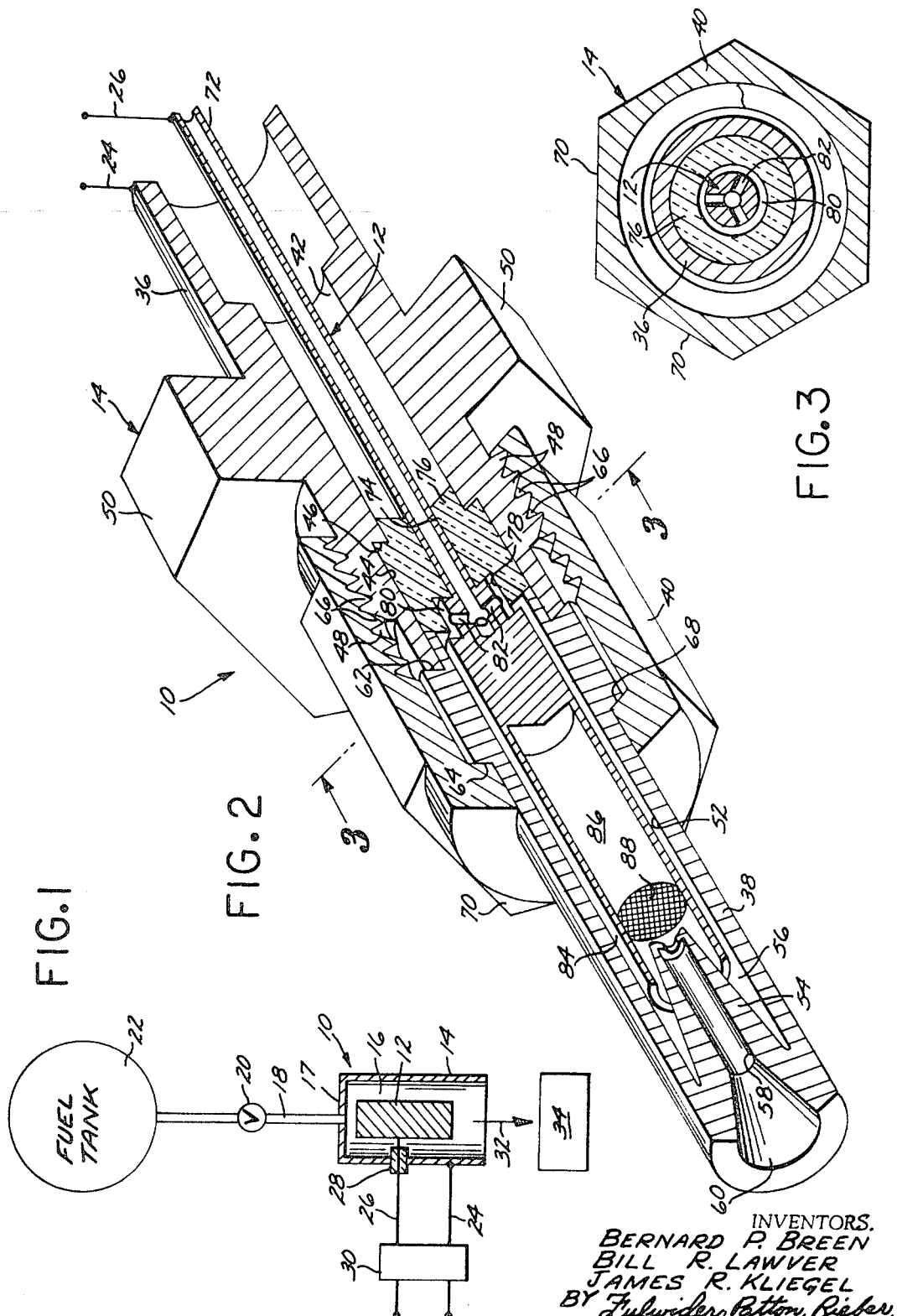

APPARATUS FOR INITIATING DECOMPOSITION OF AN EXOTHERMIC PROPELLANT

This application is a division of our copending patent application, entitled "Electrolytic Method For Initiating And Continuing Decomposition Of An Exothermic Propellant," filed Sept. 25, 1967, Ser. No. 670,242.

BACKGROUND OF THE INVENTION

1. Field of the Invention

The present invention relates to an apparatus for initiating decomposition of exothermic propellants particularly to provide easier, more rapid, and more reproducible starting of monopropellant and bipropellant engines or gas generators.

2. Description of the Prior Art

Monopropellant engines use exothermically decomposable propellant fuels or oxidizers which are usually started by a technique requiring employment of a noble metal catalyst plated on a carrier material such as aluminum oxide. The presence of the catalyst aids in initiating the monopropellant decomposition at low temperatures and in achieving its complete decomposition. This technique has disadvantages in that such a catalyst deteriorates with use; it is fragile, it is very expensive; and its use is circumscribed by the limited availability of the noble metals involved. In addition, the space-vacuum aging characteristics of catalysts are not presently known. Some catalysts also require a minimum size catalyst bed to effect initial propellant decomposition, while at high temperatures the bed size is then too great for optimum efficiency.

Other engine starting techniques of the prior art include the use of sources of concentrated energy such as a slug of reactive material injected in the engine combustion area to initiate the desired decomposition, or heating of the monopropellant or catalyst with hot wires or the like. However, these starting techniques have limited utility because of the system complications which they involve when used in engines requiring multiple starts or space-starts.

Bipropellant engines 5 monopropellant-type fuels such as hydrazine and hydrazine derivatives have been used in space vehicles or satellites because of their comparatively low combustion temperature and high thrust. However, starting of such engines at pressures below 4-5 pounds per square inch absolute, as in space, is characteristically accompanied by extremely high combustion chamber pressures immediately upon starting, the pressure sometimes being so high that the engine is destroyed. This so-called "hard" start can be eliminated if combustion is initiated by using the present apparatus, as will be seen.

Although the present invention is particularly suited for use in starting rocket engines for propulsion or for attitude control of space vehicles, other engine applications are also contemplated, and the invention is further useful in initiating decomposition of exothermic propellants in gas generators and the like, as will be apparent to those skilled in the art.

SUMMARY

The present invention relates to the initiation of decomposition of monopropellant fuels or oxidizers through the use of an electric potential to thereby start an engine, a gas generator or the like.

The present apparatus subjects the monopropellant stream, such as hydrazine for example, to an electric potential sufficient to effect electrolysis, that is, decompose or dissociate the hydrazine into its kinetically active components. This decomposition is over a relatively large area, accompanied by heat evolution and increased pressure. The increased heat tends to accelerate the decomposition rate to a point where the heat is sufficient to render the decomposition self-sustaining. The electric potential may then be shut off. It is sometimes necessary to also utilize an inert sustainer bed in the combustion chamber. The bed acts like a flame holder and glows with the heat of decomposition to thereby sustain decomposition.

Combustion or ignition of the hydrazine is started with the present apparatus much faster than was ever possible using the prior art catalyst techniques. Although the theory of operation is not completely developed, it is believed that subjection of the hydrazine stream to an electric potential by means of electrodes having relatively large surface areas produces an electrolytic effect. The electrolysis or decomposition of the hydrazine into relatively large numbers of kinetically active radicals is accompanied by considerable heat, which further speeds decomposition of the hydrazine.

As indicated previously, the apparatus is particularly suited for starting a monopropellant engine. In addition, bipropellant engines using monopropellant-type fuels such as hydrazine, or oxidizers such as hydrogen peroxide, can also be started by directing into the combustion chamber the decomposition products of the monopropellant achieved by the electrolysis described above. The heat and expansion of the decomposing monopropellant fuel or oxidizer increases the chamber pressure to a point sufficient to eliminate the hard start which normally occurs in bipropellant engines at pressures below 4-5 pounds per square inch absolute, as in outer space. The apparatus of the invention is extremely reliable, there being no moving parts, and it is characterized by long service life because of the durable materials which can be used for the component parts. The use of an electric potential is also very practical since it has been found that voltages of the same or lower magnitude as those required to operate typical feed system solenoid valves are sufficient to initiate the decomposition reaction.

BRIEF DESCRIPTION OF THE DRAWING

FIG. 1 is a schematic view of a monopropellant rocket engine utilizing the decomposition apparatus of the present invention, the illustration also schematically showing how the decomposition products thereof can be directed into the combustion chamber of a bipropellant engine;

FIG. 2 is a perspective view, partially in section, illustrating a rocket engine incorporating the apparatus of the present invention; and FIG. 3 is a view taken along the line 3—3 of FIG. 2.

DESCRIPTION OF THE PREFERRED EMBODIMENT

Referring now to the drawings and particularly to FIG. 1, there is schematically illustrated a decomposition apparatus 10 according to the present invention. The apparatus 10 includes an elongated cylindrical element 12, and an elongated cylindrical outer element 14 which is concentrically arranged around the inner element 12 in spaced relation to thereby define an elongated annular path 16. The upstream end of the element 12 is spaced from a closed end wall 17 of the element 14 to provide an open area. An elongated cylindrical geometry has been chosen by way of schematic explanation, but any practical geometry which defines a flow path between two electrodes would operate satisfactorily.

A wall 17 includes a central opening for a conduit 18 which is connected to a source of monopropellant, such as a fuel tank 22. A valve 20 in the conduit 18 is operative to initiate and control the flow of fuel from the tank 22 through the conduit 18.

The elements 12 and 14 not only define the path for the fuel, but also constitute large surface area electrodes between which is developed a direct current electric potential for electrolyzing the liquid stream of monopropellant fuel passing from the conduit 18 and through the annular path 16. The outer and inner elements 14 and 12 are electrically coupled, respectively, to the inner ends of a pair of electric leads 24 and 26, the lead 26 being carried through an electrical insulating plug 28 secured in a suitable opening in the wall of the outer element 14. The schematic showing of FIG. 1 shows the lead 26 in the path of the stream of monopropellant fuel, but it will be understood that this type of showing is merely for simplicity. A more practical working arrangement is illustrated in FIGS. 2 and 3, as will be seen.

The outer ends of the leads 24 and 26 are connected to a control panel 30 which, in turn, is connected to a suitable source of direct current. The control panel 30 embodies any suitable and conventional equipment for controlling direct current flow and voltage level, and particularly the level of electric potential developed across the elements 12 and 14.

In operation, the control valve 20 is opened to allow a stream of monopropellant fuel to pass through the conduit 18 and along the path 16. Contemporaneously, the control panel 30 is operated to apply a predetermined level of electric potential across the elements 12 and 14, such as in the order of 28 volts direct current, which is the current usually available in space vehicles because it is required by standard feed system solenoid valves. This approximate voltage level has the effect of starting decomposition of room temperature hydrazine fuel approximately 5 to 10 milliseconds after initiation of flow of the fuel through the annular space or path 16. By way of comparison, the catalyst starters of the prior art require approximately 100 milliseconds to start decomposition under similar conditions.

An arrow 32 indicates the direction of flow of the decomposed gases. As will be seen in connection with the embodiments of FIGS. 2 and 3, the outer element 14 could be configured to provide an exhaust nozzle for expanding the exhausting gases to thereby obtain thrust. Thus, the embodiment of FIG. 1 would constitute a relatively simple rocket engine which could, for example, be used in orienting a satellite in space.

If desired, the heated and expanded gases exhausting from the outer element 14 could be fed into the combustion chamber of a bipropellant engine, designated generally by the numeral 34, where they would be capable of producing sufficient combustion chamber pressure to prevent the hard start normally associated with bipropellant engines in reduced pressure atmospheres, as in outer space.

Referring now to FIGS. 2 and 3, the decomposition apparatus 10 is illustrated in an operative form rather than in the schematic form of FIG. 1.

In the apparatus 10, the outer element 14 is preferably made in three parts: an upstream portion 36, a downstream portion 38, and a connector portion 40 which connects together the portions 36 and 38.

The upstream portion 36 includes a central, axially extending bore 42 terminating at its downstream extremity in a larger diameter counterbore 44 which defines a a step or shoulder 46. This end of the portion 36 includes a plurality of external threads 48, while the middle section of the portion 36 is enlarged and provided with a plurality of flats 50 to facilitate holding or turning with a wrench or the like.

The downstream portion 38 of the outer element 14 includes a central, axially extending bore 52 open at its upstream end, but blind or closed at its downstream end. The downstream end is closed by a conical section 54 which extends in an upstream direction and tapers inwardly to define a tapered space 56 between the section 54 and the adjacent wall of the bore 52.

The upstream end of the conical section 54 includes an opening which is in communication with a larger diameter, axially extending exhaust passage 58 extending the length of the conical section 54. The passage 58 in turn, communicates with a diverging opening which is provided in the downstream end of the outer element 14 and constitutes an expansion or exhaust nozzle 60.

The end of the downstream portion 38 which is adjacent to the upstream portion 36 includes a larger diameter annular band whose end margins define a pair of axially spaced apart shoulders 62 and 64. The shoulder 62 abuts the adjacent end of the portion 36.

The middle or connector portion 40 of the outer element 14 includes an axially extending opening provided at its upstream extremity with a plurality of internal threads 66 which complementally engage the external threads 48 of the upstream portion 36. In addition, the opposite end of the connector portion 40 includes a reduced diameter portion which defines a shoulder 68 in abutment with the shoulder 64 of the downstream portion 38. A plurality of flats 70 on the connector portion 40 permit its rotation for tightening of the threads 48 upon the threads 66 to clamp the upstream and downstream portions 36 and 38 together.

The inner element 12 includes an elongated tubular portion 72 which extends into the bore 42 of the outer element 14 and also into a bore 74 of a cylindrical, electrical insulating plug 76. The outer surface of the insulator plug 76 is provided with spaced flanges or abutments in engagement between the shoulder 46 of the upstream portion 36 and the upstream end of the downstream portion 38 to thereby locate and hold the plug 76 in the position illustrated. The plug 76 also thereby properly locates and electrically insulates the inner element 12 which is supported in its bore 74.

The downstream extremity of the insulating plug 76 includes a counterbore 78 having a cylindrical wall which is spaced away from the adjacent rounded outer surface of the inner element 72. This defines an annular space which is connected to the hollow interior of the inner element 12 by three radially oriented passages 82 provided in the wall of the inner element 12.

The transverse cross section of the inner element 12 just downstream of the space 80 increases to provide a relatively thin, axially extending annular space 84 adjacent to the outer element 14. This provides a relatively large ratio of surface area of the adjoining elements 12 and 14 to volume of hydrazine passing through the space 84 between the elements 12 and 14.

The downstream end of the inner element 12 extends into the space 56 adjacent to the conical section 54, and is spaced from the adjacent surface of the section 54. Moreover, the upstream end of the section 54 extends into a hollow, axially extending, cylindrical chamber 86 provided in the inner element 12. Consequently, a continuous path or passage is provided from the bore 74, through the radial openings 82, through the space 80, through the space 84, through the space 56, and into the chamber 86.

The downstream end of the chamber 86 is closed and mounts a circular, transversely oriented sustainer bed 88 carrying silicon oxide pellets or the like (not shown) which serve as a reservoir for heat. The bed 88 absorbs the initial heat of decomposition and glows to sustain combustion in the chamber 86.

The connection of the electrical leads 24 and 26 to the inner and outer elements 12 and 14 is diagrammatically indicated by single lines in FIG. 2 for simplicity, it being apparent that these connections can be made in any suitable manner.

In operation, the fuel valve 20 is opened to admit monopropellant fuel such as hydrazine into the hollow interior of the tubular portion 72. From this point the hydrazine passes through the radial openings 82, into the annular space 80, and along the narrow, axially extending and annular space 84. At the end of the space 84, the path of the fuel is reversed, and it flows into the space 56, and then empties into the combustion chamber 86.

Contemporaneously with operation of the control valve 20 to admit hydrazine into the apparatus 10, a direct current electric potential is continuously applied across the electrically insulated inner and outer elements 12 and 14. The potential is adjusted at the control panel 30 to a level sufficient to effect decomposition of the hydrazine in the spaces between the outer and inner electrodes or elements 12 and 14. The electrolysis or decomposition of the hydrazine is comparatively rapid and accompanied by heat.

The hydrazine decomposition products rapidly rise in temperature and in volume because of the released heat, and the inert sustainer bed 88 glows and tends to sustain combustion. Once decomposition has begun, it is feasible in many applications to cut off the electric potential from the elements 12 and 14, and the decomposition will continue because of the self-sustaining character of the reaction occurring when hydrazine is exposed to a high temperature environment.

The bed 88 is particularly useful in providing a self-sustaining operation wherever the mass of the apparatus 10 is relatively large and thus has a tendency to rapidly drain away the heat of the decomposition and expose a low-heat transfer area relative to the large fuel flow rate. The inert bed 88 is normally not necessary where the mass or arrangement of the apparatus 10 is such that heat is not rapidly drained away and a large heat transfer surface per unit flow rate is maintained.

By virtue of the exhaust nozzle 60, the apparatus 10 of FIGS. 2 and 3 functions as a form of rocket engine, the hydrazine gases in the chamber 86 discharging through the passage 58 and expanding through the nozzle 60 to provide thrust.

As previously indicated, the theory of operation of the apparatus 10 is not completely established, but apparently the electrolysis-like action of the electrical potential upon the stream of monopropellant releases a high concentration of kinetically active radicals. This is accompanied by a heat of decomposition, and the process of decomposition is thereafter accelerated by the rapidly increasing temperatures of the decomposition products. Consequently, the apparatus 10 is believed to be suitable for use in effecting decomposition of any exothermic propellant whose decomposition into kinetically active radicals is accompanied by evolution of heat and increase of volume. The propellant can be a monopropellant fuel of the hydrazine-type described, or it can be an oxidizer such as hydrogen peroxide. The propellant can therefore be one used in either a monopropellant or a bipropellant engine, or in various forms of gas generators adapted to utilize exothermic materials.

Various modifications and changes may be made with regard to the foregoing detailed description without departing from the spirit of the invention or the scope of the following claims.

We claim:

1. Apparatus for liberating the heat of decomposition of an exothermic propellant capable of being electrolyzed, said apparatus comprising: means defining a path for a stream of exothermally decomposable propellant and including a pair of spaced-apart, oppositely polarized electrodes adjacent to said path; and means for developing across said electrodes an electric potential greater than the decomposition voltage of said propellant whereby said propellant is electrolytically decomposed exothermally and without disruptive electric discharge across said electrodes.

2. Apparatus according to claim 1 and including a source of propellant and a conduit connecting said source to said path; and wherein said propellant is hydrazine fuel.

3. Apparatus according to claim 1 wherein said means defining said path comprises an elongated cylindrical element and an elongated sleeve surrounding said element, said element and said sleeve constituting said electrodes, whereby said path is an elongated annular space.

4. Apparatus according to claim 3 wherein said element includes a hollow chamber in communication with said path, and wherein said sleeve includes an expansion nozzle and a passage connecting said nozzle and said chamber whereby the propellant decomposition products are dischargeable through said nozzle to derive thrust.

* * * * *